United States Patent
Muta et al.

(10) Patent No.: US 7,749,130 B2
(45) Date of Patent: Jul. 6, 2010

(54) VEHICLE, DRIVING SYSTEM, AND CONTROL METHODS OF THE SAME

(75) Inventors: Koichiro Muta, Okazaki (JP); Tomokazu Nomura, Anjo (JP); Daisuke Suyama, Toyota (JP)

(73) Assignees: Toyota Jidosha Kabushiki Kaisha, Toyota-shi (JP); Aisin AW Co., Ltd., Anjo-shi (JP)

( * ) Notice: Subject to any disclaimer, the term of this patent is extended or adjusted under 35 U.S.C. 154(b) by 461 days.

(21) Appl. No.: 11/902,283

(22) Filed: Sep. 20, 2007

(65) Prior Publication Data
US 2008/0083292 A1 Apr. 10, 2008

(30) Foreign Application Priority Data
Oct. 4, 2006 (JP) ............... 2006-272434

(51) Int. Cl.
*B60K 1/02* (2006.01)
*F16H 3/72* (2006.01)
(52) U.S. Cl. ................. 477/3; 475/5; 903/945
(58) Field of Classification Search ...... 475/5; 477/3; 180/65.7; 903/945
See application file for complete search history.

(56) References Cited

U.S. PATENT DOCUMENTS

2001/0049575 A1 * 12/2001 Muratomi .......... 701/62

2007/0173371 A1 * 7/2007 Hayashi et al. .......... 477/3

FOREIGN PATENT DOCUMENTS

| JP | A-2005-351459 | 12/2005 |
|---|---|---|
| JP | A 2006-029439 | 2/2006 |

* cited by examiner

*Primary Examiner*—Roger Pang
(74) *Attorney, Agent, or Firm*—Oliff & Berridge, PLC

(57) ABSTRACT

At the time of a change of a gearshift position SP from a neutral (N) position to a drive (D) position (step S220), when a vehicle speed V is not lower than a preset reference speed Vref1 (step S230: yes), the control procedure of the invention connects a power shaft with a driveshaft and attains an actual gear change of a transmission to a first speed (step S240). The reference speed Vref1 may be set to a slightly higher vehicle speed than an upper limit of a specific vehicle speed range having a potential for over rotation of a first motor by the gear change of the transmission to the first speed. When the vehicle speed V is lower than the preset reference speed Vref1 (step S230: no), on the other hand, the control procedure prohibits the connection of the power shaft with the driveshaft and the actual gear change of the transmission to the first speed. This arrangement desirably prevents the over rotation of the first motor caused by the gear change of the transmission to the first speed in the state that the vehicle speed V is lower than the preset reference speed Vref1.

11 Claims, 6 Drawing Sheets

VEHICLE, DRIVING SYSTEM, AND CONTROL METHODS OF THE SAME

BACKGROUND

1. Technical Field

The present invention relates to a vehicle, a driving system, and control methods of the vehicle and the driving system.

2. Related Art

One proposed structure of a vehicle is equipped with an engine, a power distribution mechanism having a carrier connected to the engine, a first motor connected to a sun gear of the power distribution mechanism, a second motor linked to a transmission member connected to a ring gear of the power distribution mechanism, and an automatic transmission that converts power of the transmission member and transmits the converted power to an output shaft linked to drive wheels (see, for example, Japanese Patent Laid-Open Gazette No. 2006-29439). In the event of the driver's operation of a gearshift lever to a reverse position during forward drive of the vehicle at a vehicle speed of or over a preset level, the vehicle of this proposed structure idles the two motors to prohibit reverse drive of the vehicle even in the state of an actual gear change of the automatic transmission in response to the driver's operation of the gearshift lever.

SUMMARY

The vehicle generally releases the connection of the transmission member with the output shaft at the setting of the gearshift lever to a neutral position. The driver may operate the gearshift lever from the neutral position to a drive position, when the vehicle slides down or otherwise moves back on an upslope. In this state, connection of the transmission member with the output shaft at a predetermined rotation speed ratio (for example, at a gear ratio in a first speed) by means of the automatic transmission may drastically fluctuate the rotation speed of the ring gear according to the vehicle speed and the engine rotation speed. The drastic fluctuation of the rotation speed of the ring gear may lead to over rotation of the first motor.

In a vehicle and a driving system of the invention equipped with an electric power-mechanical power input output structure that is connected to an output shaft of an internal combustion engine and to a power shaft, which is rotatable independently of the output shaft, and inputs and outputs driving force from and to the output shaft and the power shaft with rotation based on a rotation speed of the output shaft and a rotation speed of the power shaft and input and output of electric powers and mechanical powers, and control methods of the vehicle and the driving system, there is a need of preventing over rotation of the electric power-mechanical power input output structure at the time of a change of a gearshift position from a neutral position to a driving position.

At least part of the above and the other related demands is attained by a vehicle and a driving system of the invention and control methods of the vehicle and the driving system having the configurations discussed below.

According to one aspect, the present invention is directed to a vehicle including: an internal combustion engine; an electric power-mechanical power input output structure that is connected to an output shaft of the internal combustion engine and to a power shaft, which is rotatable independently of the output shaft, and inputs and outputs driving force from and to the output shaft and the power shaft with rotation based on a rotation speed of the output shaft and a rotation speed of the power shaft and input and output of electric powers and mechanical powers; an accumulator that transmits electric power to and from the electric power-mechanical power input output structure; a transmission that is constructed to connect the power shaft with a driveshaft linked to drive wheels for transmission of power between the power shaft and the driveshaft with a change of speed and to disconnect the power shaft from the driveshaft; a vehicle speed measurement unit that measures a vehicle speed; a gearshift position detection unit that detects a setting of gearshift position; a target state setting module that sets a target state of the transmission based on the detected setting of gearshift position; and a control module that controls the transmission to connect the power shaft with the driveshaft and attain an actual gear change of the transmission to the target state in response to a change of the gearshift position from a neutral position to a driving position when the measured vehicle speed is within a predetermined vehicle speed range, while controlling the transmission to prohibit the connection of the power shaft with the driveshaft and the actual gear change of the transmission to the target state regardless of the change of the gearshift position from the neutral position to the driving position when the measured vehicle speed is out of the predetermined vehicle speed range.

When the vehicle speed is within the predetermined vehicle speed range at the time of the change of the gearshift position from the neutral position to the driving position, the vehicle of the invention controls the transmission to connect the power shaft with the driveshaft and attain an actual gear change of the transmission to the target state set based on the gearshift position. When the vehicle speed is out of the predetermined vehicle speed range, on the other hand, the vehicle of the invention controls the transmission to prohibit the connection of the power shaft with the drive shaft and the actual gear change of the transmission to the target state regardless of the change of the gearshift position from the neutral position to the driving position. The predetermined vehicle speed range is, for example, a vehicle speed range that restricts a rotation speed of the electric power-mechanical power input output structure to or below its allowable rotation speed by the connection of the power shaft with the driveshaft to attain the actual gear change of the transmission to the target state at least in an operation stop state of the internal combustion engine. The vehicle of the invention prohibits the connection of the power shaft with the driveshaft when the vehicle speed is out of this vehicle speed range at the time of the change of the gearshift position from the neutral position to the driving position. This arrangement effectively prevents over rotation of the electric power-mechanical power input output structure, compared with the conventional system of connecting the power shaft with the driveshaft to attain the actual gear change of the transmission to the target state, regardless of the vehicle speed. The target state of the transmission is, for example, a gear position of reducing the rotation speed of the power shaft at a relatively high reduction ratio and transmitting the reduced rotation speed to the driveshaft at a setting of the gearshift position to a drive position for forward drive of the vehicle, a gear position of reversing and reducing the rotation speed of the power shaft and transmitting the reversed and reduced rotation speed to the driveshaft at a setting of the gearshift position to a reverse position for reverse drive of the vehicle, or a gear position of disconnecting the power shaft from the driveshaft at a setting of the gearshift position to a neutral position.

In one preferable application of the vehicle of the invention, the electric power-mechanical power input output structure includes: a three shaft-type power input output mechanism that is connected to three shafts, the output shaft of the internal combustion engine, the power shaft, and a third shaft and determines input and output of power into and from a remaining shaft based on input and output of powers into and from any two shafts among the three shafts; and a generator that inputs and outputs power into and from the third shaft.

In one preferable embodiment of the vehicle having the three shaft-type power input output mechanism and the generator as the electric power-mechanical power input output structure, the control module performs the control with regarding a state expected to restrict a rotation speed of the generator to or below an allowable rotation speed of the generator by the connection of the power shaft with the driveshaft at least in an operation stop state of the internal combustion engine as the measured vehicle speed within the predetermined vehicle speed range and regarding a state expected to make the rotation speed of the generator exceed the allowable rotation speed of the generator by the connection of the power shaft with the driveshaft irrespective of a current status of the internal combustion engine as the measured vehicle speed out of the predetermined vehicle speed range. This arrangement effectively prevents over rotation of the generator.

In another preferable embodiment of the vehicle having the three shaft-type power input output mechanism and the generator as the electric power-mechanical power input output structure, when a maximum rotation speed of the internal combustion engine, which is set based on either one of the vehicle speed and a rotation speed of the driveshaft, a change gear ratio in a specified speed of the transmission, and an allowable rotation speed of the generator, is lower than a preset reference rotation speed and when the measured vehicle speed is within the predetermined vehicle speed range at a time of a change of the gearshift position from the neutral position to the driving position, the control module controls the internal combustion engine and the transmission to connect the power shaft with the driveshaft and attain the actual gear change of the transmission to the target state in an operation stop state of the internal combustion engine. The reference rotation speed may be an idling rotation speed. In the vehicle of this embodiment, it is preferable that the control module controls the internal combustion engine to stop its operation, when the maximum rotation speed of the internal combustion engine is lower than the preset reference rotation speed at the gearshift position set to the neutral position. This arrangement ensures the quicker gear change of the transmission to the target state, compared with the conventional system of stopping operation of the internal combustion engine only after the change of the gearshift position from the neutral position to the driving position. In the vehicle of this embodiment, it is also preferable that the control module sets the maximum rotation speed of the internal combustion engine with setting a speed for forward drive of the vehicle to the specified speed of the transmission during reverse drive of the vehicle, while setting the maximum rotation speed of the internal combustion engine with setting a speed for reverse drive of the vehicle to the specified speed of the transmission during forward drive of the vehicle.

In one preferable structure of the vehicle of the invention, the transmission has multiple clutches and engages and releases the multiple clutches to connect the power shaft with the driveshaft for transmission of power between the power shaft and the driveshaft with a change of speed and to disconnect the power shaft from the driveshaft. The terminology 'clutch' in the specification hereof includes not only a conventional clutch that connects two rotation systems but a brake that fixes one rotation system to a non-rotation system, such as casing.

The vehicle of the invention may further include a motor that inputs and outputs power from and to the power shaft and transmits electric power to and from the accumulator.

According to another aspect, the present invention is also directed to a driving system that is mounted in combination with an internal combustion engine and an accumulator on a vehicle. The driving system of the invention includes: an electric power-mechanical power input output structure that is connected to an output shaft of the internal combustion engine and to a power shaft, which is rotatable independently of the output shaft, transmits electric power to and from the accumulator, and inputs and outputs driving force from and to the output shaft and the power shaft with rotation based on a rotation speed of the output shaft and a rotation speed of the power shaft and input and output of electric powers and mechanical powers; a transmission that is constructed to connect the power shaft with a driveshaft linked to drive wheels for transmission of power between the power shaft and the driveshaft with a change of speed and to disconnect the power shaft from the driveshaft; a drive shaft rotation speed measurement unit that measures a rotation speed of the driveshaft; a target state setting module that sets a target state of the transmission based on a setting of gearshift position; and a control module that controls the transmission to connect the power shaft with the driveshaft and attain an actual gear change of the transmission to the target state in response to a change of the gearshift position from a neutral position to a driving position when the measured rotation speed of the driveshaft is within a predetermined rotation speed range, while controlling the transmission to prohibit the connection of the power shaft with the driveshaft and the actual gear change of the transmission to the target state regardless of the change of the gearshift position from the neutral position to the driving position when the measured rotation speed of the driveshaft is out of the predetermined rotation speed range.

When the measured rotation speed of the driveshaft is within a predetermined rotation speed range at the time of the change of the gearshift position from the neutral position to the driving position, the driving system of the invention controls the transmission to connect the power shaft with the driveshaft and attain an actual gear change of the transmission to the target state set based on the gearshift position. When the measured rotation speed of the driveshaft is out of the predetermined rotation speed range, on the other hand, the driving system of the invention controls the transmission to prohibit the connection of the power shaft with the drive shaft and the actual gear change of the transmission to the target state regardless of the change of the gearshift position from the neutral position to the driving position. The predetermined rotation speed range is, for example, a rotation speed range that restricts a rotation speed of the electric power-mechanical power input output structure to or below its allowable rotation speed by the connection of the power shaft with the driveshaft to attain the actual gear change of the transmission to the target state at least in an operation stop state of the internal combustion engine. The driving system of the invention prohibits the connection of the power shaft with the driveshaft when the rotation speed of the driveshaft is out of this rotation speed range at the time of the change of the gearshift position from the neutral position to the driving position. This arrangement effectively prevents over rotation of the electric power-mechanical power input output structure, compared with the conventional system of connecting the power shaft with the driveshaft to attain the actual gear change of the transmission to the target state, regardless of the rotation speed of the driveshaft. The target state of the transmission is, for example, a gear position of reducing the rotation speed of the power shaft at a relatively high reduction ratio and transmitting the reduced rotation speed to the driveshaft at a setting of the gearshift position to a drive position for forward drive of the vehicle, or a gear position of reversing and reducing the rotation speed of the power shaft and transmitting the reversed and reduced rotation speed to the driveshaft at a setting of the gearshift position to a reverse position for reverse drive of the vehicle.

According to still another aspect, the present invention is further directed to a control method of a vehicle. The vehicle has: an internal combustion engine; an electric power-mechanical power input output structure that is connected to an output shaft of the internal combustion engine and to a power shaft, which is rotatable independently of the output shaft, and inputs and outputs driving force from and to the output shaft and the power shaft with rotation based on a rotation speed of the output shaft and a rotation speed of the power shaft and input and output of electric powers and mechanical powers; an accumulator that transmits electric power to and from the electric power-mechanical power input output structure; and a transmission that is constructed to connect the power shaft with a driveshaft linked to drive wheels for transmission of power between the power shaft and the driveshaft with a change of speed and to disconnect the power shaft from the driveshaft. The control method sets a target state of the transmission based on a setting of gearshift position. The control method then controls the transmission to connect the power shaft with the driveshaft and attain an actual gear change of the transmission to the target state in response to a change of the gearshift position from a neutral position to a driving position when vehicle speed is within a predetermined vehicle speed range, while controlling the transmission to prohibit the connection of the power shaft with the driveshaft and the actual gear change of the transmission to the target state regardless of the change of the gearshift position from the neutral position to the driving position when the vehicle speed is out of the predetermined vehicle speed range.

When the vehicle speed is within the predetermined vehicle speed range at the time of the change of the gearshift position from the neutral position to the driving position, the control method of the vehicle of the invention controls the transmission to connect the power shaft with the driveshaft and attain an actual gear change of the transmission to the target state set based on the gearshift position. When the vehicle speed is out of the predetermined vehicle speed range, on the other hand, the control method of the vehicle of the invention controls the transmission to prohibit the connection of the power shaft with the drive shaft and the actual gear change of the transmission to the target state regardless of the change of the gearshift position from the neutral position to the driving position. The predetermined vehicle speed range is, for example, a vehicle speed range that restricts a rotation speed of the electric power-mechanical power input output structure to or below its allowable rotation speed by the connection of the power shaft with the driveshaft to attain the actual gear change of the transmission to the target state at least in an operation stop state of the internal combustion engine. The control method of the vehicle of the invention prohibits the connection of the power shaft with the driveshaft when the vehicle speed is out of this vehicle speed range at the time of the change of the gearshift position from the neutral position to the driving position. This arrangement effectively prevents over rotation of the electric power-mechanical power input output structure, compared with the conventional system of connecting the power shaft with the driveshaft to attain the actual gear change of the transmission to the target state, regardless of the vehicle speed. The target state of the transmission is, for example, a gear position of reducing the rotation speed of the power shaft at a relatively high reduction ratio and transmitting the reduced rotation speed to the driveshaft at a setting of the gearshift position to a drive position for forward drive of the vehicle, or a gear position of reversing and reducing the rotation speed of the power shaft and transmitting the reversed and reduced rotation speed to the driveshaft at a setting of the gearshift position to a reverse position for reverse drive of the vehicle.

According to another aspect, the present invention is also directed to a control method of a driving system. The driving system is mounted in combination with an internal combustion engine and an accumulator on a vehicle and has: an electric power-mechanical power input output structure that is connected to an output shaft of the internal combustion engine and to a power shaft, which is rotatable independently of the output shaft, transmits electric power to and from the accumulator, and inputs and outputs driving force from and to the output shaft and the power shaft with rotation based on a rotation speed of the output shaft and a rotation speed of the power shaft and input and output of electric powers and mechanical powers; and a transmission that is constructed to connect the power shaft with a driveshaft linked to drive wheels for transmission of power between the power shaft and the driveshaft with a change of speed and to disconnect the power shaft from the driveshaft. The control method sets a target state of the transmission based on a setting of gearshift position. The control method then controls the transmission to connect the power shaft with the driveshaft and attain an actual gear change of the transmission to the target state in response to a change of the gearshift position from a neutral position to a driving position when rotation speed of the driveshaft is within a predetermined rotation speed range, while controlling the transmission to prohibit the connection of the power shaft with the driveshaft and the actual gear change of the transmission to the target state regardless of the change of the gearshift position from the neutral position to the driving position when the rotation speed of the driveshaft is out of the predetermined rotation speed range.

When the measured rotation speed of the driveshaft is within a predetermined rotation speed range at the time of the change of the gearshift position from the neutral position to the driving position, the control method of the driving system of the invention controls the transmission to connect the power shaft with the driveshaft and attain an actual gear change of the transmission to the target state set based on the gearshift position. When the measured rotation speed of the driveshaft is out of the predetermined rotation speed range, on the other hand, the control method of the driving system of the invention controls the transmission to prohibit the connection of the power shaft with the drive shaft and the actual gear change of the transmission to the target state regardless of the change of the gearshift position from the neutral position to the driving position. The predetermined rotation speed range is, for example, a rotation speed range that restricts a rotation speed of the electric power-mechanical power input output structure to or below its allowable rotation speed by the connection of the power shaft with the driveshaft to attain the actual gear change of the transmission to the target state at least in an operation stop state of the internal combustion engine. The control method of the driving system of the invention prohibits the connection of the power shaft with the driveshaft when the rotation speed of the driveshaft is out of this rotation speed range at the time of the change of the gearshift position from the neutral position to the driving position. This arrangement effectively prevents over rotation of the electric power-mechanical power input output structure, compared with the conventional system of connecting the power shaft with the driveshaft to attain the actual gear change of the transmission to the target state, regardless of the rotation speed of the driveshaft. The target state of the transmission is, for example, a gear position of reducing the rotation speed of the power shaft at a relatively high reduction ratio and transmitting the reduced rotation speed to the driveshaft at a setting of the gearshift position to a drive position for forward drive of the vehicle, or a gear position of reversing and reducing the rotation speed of the power shaft and transmitting the reversed and reduced rotation speed to the driveshaft at a setting of the gearshift position to a reverse position for reverse drive of the vehicle.

DESCRIPTION OF THE PREFERRED EMBODIMENTS

Figure 1:
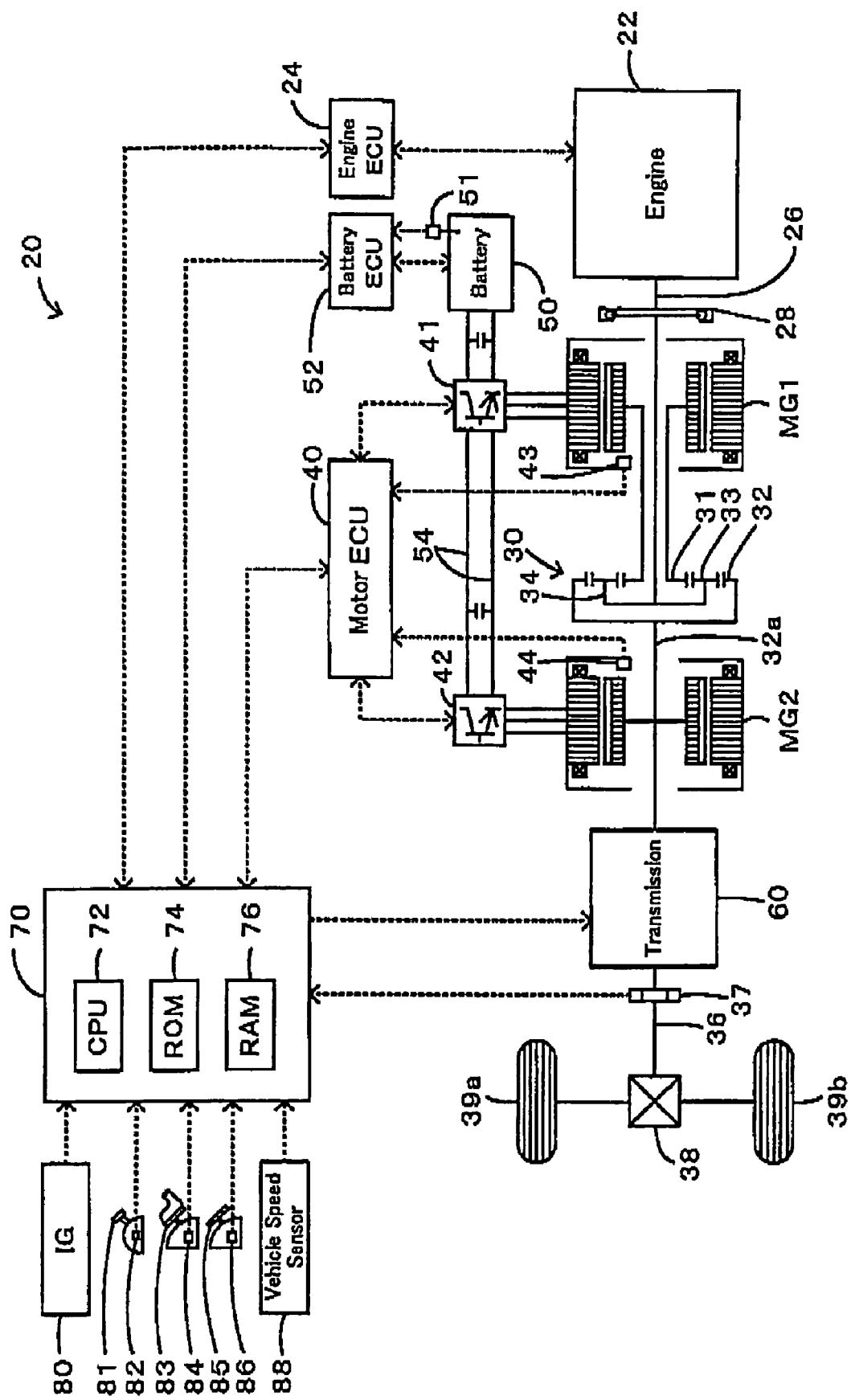
FIG. 1 schematically illustrates the configuration of a hybrid vehicle in one embodiment of the invention.

One mode of carrying out the invention is described below as a preferred embodiment. FIG. 1 schematically illustrates the configuration of a hybrid vehicle 20 in one embodiment of the invention. As illustrated, the hybrid vehicle 20 of the embodiment includes an engine 22, a three shaft-type power distribution integration mechanism 30 that is linked to a crankshaft 26 or an output shaft of the engine 22 via a damper 28, a motor MG1 that is linked to the power distribution integration mechanism 30 and has power generation capability, a motor MG2 that is linked to a ring gear shaft 32a or a power shaft connected to the power distribution integration mechanism 30, a transmission 60 that converts power of the ring gear shaft 32a and outputs the converted power to a driveshaft 36 connected to drive wheels 39a and 39b, and a hybrid electronic control unit 70 that controls the operations of the whole hybrid vehicle 20.

The engine 22 is an internal combustion engine that uses a hydrocarbon fuel, such as gasoline or light oil, to output power. An engine electronic control unit (hereafter referred to as engine ECU) 24 receives signals from diverse sensors that detect operating conditions of the engine 22, and takes charge of operation control of the engine 22, for example, fuel injection control, ignition control, and intake air flow regulation. The engine ECU 24 communicates with the hybrid electronic control unit 70 to control operations of the engine 22 in response to control signals transmitted from the hybrid electronic control unit 70 while outputting data relating to the operating conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the ring gear shaft 32a or a rotational shaft. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 39a and 39b via the transmission 60, the driveshaft 36 and a differential gear 38 from ring gear shaft 32a.

Both the motors MG1 and MG2 are known synchronous motor generators that are driven as a generator and as a motor. The motors MG1 and MG2 transmit electric power to and from a battery 50 via inverters 41 and 42. Power lines 54 that connect the inverters 41 and 42 with the battery 50 are constructed as a positive electrode bus line and a negative electrode bus line shared by the inverters 41 and 42. This arrangement enables the electric power generated by one of the motors MG1 and MG2 to be consumed by the other motor. The battery 50 is charged with a surplus of the electric power generated by the motor MG1 or MG2 and is discharged to supplement an insufficiency of the electric power. When the power balance is attained between the motors MG1 and MG2, the battery 50 is neither charged nor discharged. Operations of both the motors MG1 and MG2 are controlled by a motor electronic control unit (hereafter referred to as motor ECU) 40. The motor ECU 40 receives diverse signals required for controlling the operations of the motors MG1 and MG2, for example, the rotational positions of rotors in the motors MG1 and MG2 from rotational position detection sensors 43 and 44 that detect the rotational positions of rotors in the motors MG1 and MG2 and phase currents applied to the motors MG1 and MG2 and measured by current sensors (not shown). The motor ECU 40 outputs switching control signals to the inverters 41 and 42. The motor ECU 40 communicates with the hybrid electronic control unit 70 to control operations of the motors MG1 and MG2 in response to control signals transmitted from the hybrid electronic control unit 70 while outputting data relating to the operating conditions of the motors MG1 and MG2 to the hybrid electronic control unit 70 according to the requirements.

Figure 2:
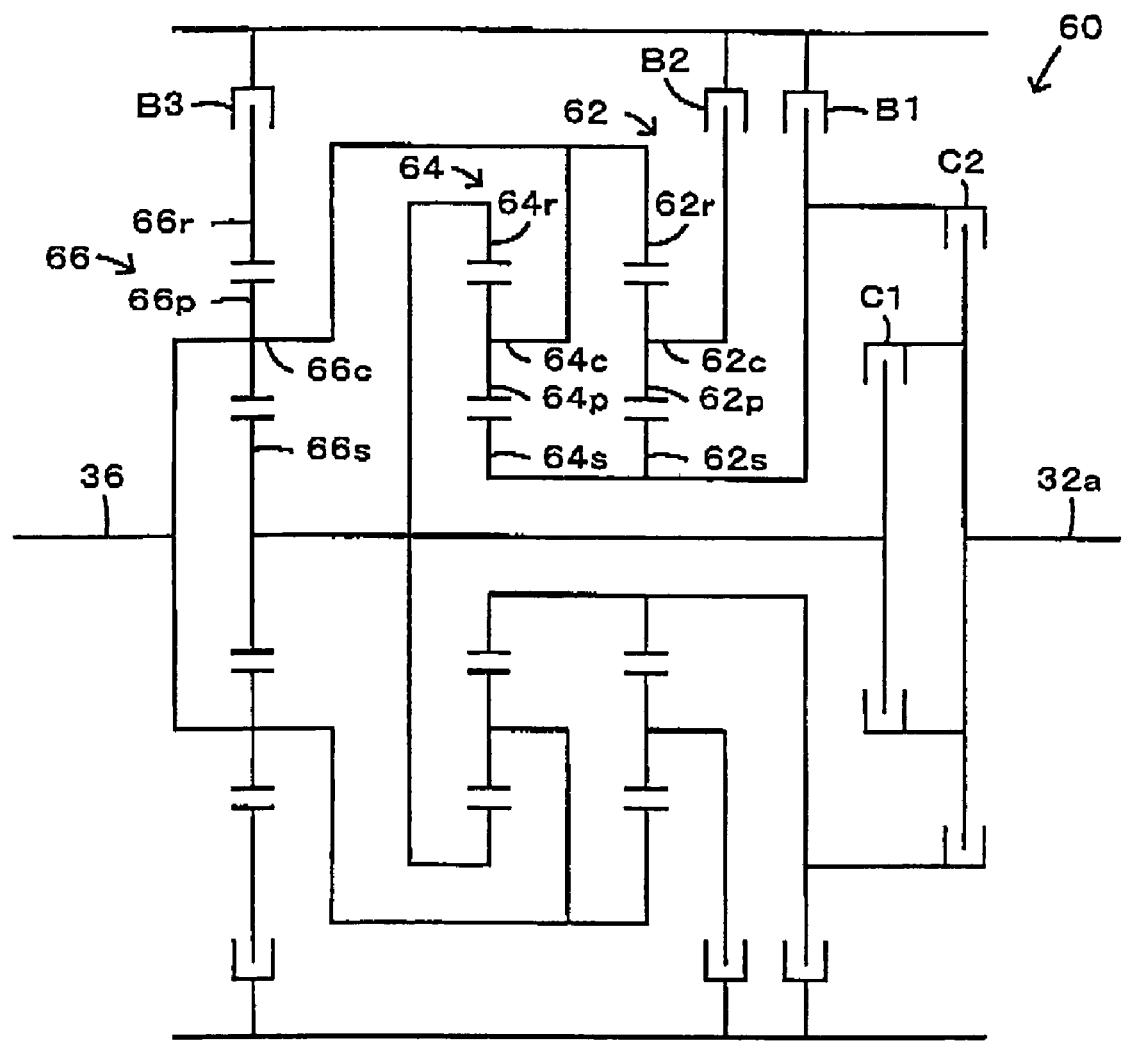
FIG. 2 schematically shows the structure of a transmission mounted on the hybrid vehicle.

The transmission 60 is constructed to connect the ring gear shaft 32a as the power shaft with the driveshaft 36 for transmission of power between the ring gear shaft 32a and the driveshaft 36 with a change of the speed and to disconnect the ring gear shaft 32a from the driveshaft 36. One example of the structure of the transmission 60 is shown in FIG. 2. The transmission 60 of FIG. 2 has single-pinion planetary gear mechanisms 62, 64, and 66, two clutches C1 and C2, and three brakes B1, B2, and B3. The planetary gear mechanism 62 includes a sun gear 62s as an external gear, a ring gear 62r as an internal gear arranged concentrically with the sun gear 62s, multiple pinion gears 62p engaging with the sun gear 62s and with the ring gear 62r, and a carrier 62c holding the multiple pinion gears 62p to allow both their revolutions and their rotations on their axes. The sun gear 62s is connected to and is disconnected from the ring gear shaft 32a by engagement and release of the clutch C2. Engagement and release of the brake B1 stop and allow the rotation of the sun gear 62s, while engagement and release of the brake B2 stop and allow the rotation of the carrier 62c. The planetary gear mechanism 64 includes a sun gear 64s as an external gear, a ring gear 64r as an internal gear arranged concentrically with the sun gear 64s, multiple pinion gears 64p engaging with the sun gear 64s and with the ring gear 64r, and a carrier 64c holding the multiple pinion gears 64p to allow both their revolutions and their rotations on their axes. The sun gear 64s is linked to the sun gear 62s of the planetary gear mechanism 62. The ring gear 64r is connected to and is disconnected from the ring gear shaft 32a by engagement and release of the clutch C1. The carrier 64c is linked to the ring gear 62r of the planetary gear mechanism 62. The planetary gear mechanism 66 includes a sun gear 66s as an external gear, a ring gear 66r as an internal gear arranged concentrically with the sun gear 66s, multiple pinion gears 66p engaging with the sun gear 66s and with the ring gear 66r, and a carrier 66c holding the multiple pinion gears 66p to allow both their revolutions and their rotations on their axes. The sun gear 66s is linked to the ring gear 64r of the planetary gear mechanism 64. Engagement and release of the brake B3 stop and allow the rotation of the ring gear 66r. The carrier 66c is linked to the ring gear 62r of the planetary gear mechanism 62, to the carrier 64c of the planetary gear mechanism 64, and to the driveshaft 36. In the transmission 60, the release of all the clutches C1 and C2 and the brakes B1, B2, and B3 disconnects the ring gear shaft 32a from the drive shaft 36. The engagement of the clutch C1 and the brake B3 in combination with the release of the clutch C2 and the brakes B1 and B2 reduces the rotation of the ring gear shaft 32a at a relatively high reduction ratio and transmits the reduced rotation to the driveshaft 36. Hereafter this state is referred to as the 'first speed'. The engagement of the clutch C1 and the brake B2 in combination with the release of the clutch C2 and the brakes B1 and B3 reduces the rotation of the ring gear shaft 32a at a lower reduction ratio than that in the first speed and transmits the reduced rotation to the driveshaft 36. Hereafter this state is referred to as the 'second speed'. The engagement of the clutch C1 and the brake B1 in combination with the release of the clutch C2 and the brakes B2 and B3 reduces the rotation of the ring gear shaft 32a at a lower reduction ratio than that in the second speed and transmits the reduced rotation to the driveshaft 36. Hereafter this state is referred to as the 'third speed'. The engagement of the clutches C1 and C2 in combination with the release of the brakes B1, B2, and B3 directly transmits the rotation of the ring gear shaft 32a to the driveshaft 36 without speed reduction. Hereafter this state is referred to as the 'fourth speed'. In the transmission 60, the engagement of the clutch C2 and the brake B3 in combination with the release of the clutch C1 and the brakes B1 and B2 reverses and reduces the rotation of the ring gear shaft 32a and transmits the reversed and reduced rotation to the driveshaft 36. Hereafter this state is referred to as the 'reverse speed'. In the structure of this embodiment, a hydraulic actuator (not shown) is driven to regulate the hydraulic pressures applied to the clutches C1 and C2 and the brakes B1, B2, and B3 and thereby control the engagement and the release of the clutches C1 and C2 and the brakes B1, B2, and B3.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor 51 attached to the battery 50. The battery ECU 52 outputs data relating to the state of the battery 50 to the hybrid electronic control unit 70 via communication according to the requirements The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, input and output ports (not shown), and a communication port (not shown). The hybrid electronic control unit 70 receives, via its input port, a rotation speed No of the driveshaft 36 from a rotation speed sensor 37, an ignition signal from an ignition switch 80, a gearshift position SP or a current setting position of a gearshift lever 81 from a gearshift position sensor 82, an accelerator opening Acc or the driver's depression amount of an accelerator pedal 83 from an accelerator pedal position sensor 84, a brake pedal position BP or the driver's depression amount of a brake pedal 85 from a brake pedal position sensor 86, and a vehicle speed V in the longitudinal direction of the hybrid vehicle 20 from a vehicle speed sensor 88. The hybrid electronic control unit 70 outputs, via its output port, operation signals to the actuator (not shown) for the clutches C1 and C2 and the brakes B1, B2, and B3 of the transmission 60. The hybrid electronic control unit 70 establishes communication with the engine ECU 24, the motor ECU 40, and the battery ECU 52 via its communication port to receive and send diversity of control signals and data from and to the engine ECU 24, the motor ECU 40, and the battery ECU 52, as mentioned above.

In the hybrid vehicle 20 of the embodiment, the gearshift position SP of the gearshift lever 81 detected by the gearshift position sensor 82 has multiple different options: parking position (P position), neutral position (N position), drive position (D position), and reverse position (R position).

The hybrid vehicle 20 of the embodiment constructed as described above sets a torque demand to be output to the ring gear shaft 32a or the power shaft, based on the vehicle speed V and the accelerator opening Acc (corresponding to the driver's depression amount of the accelerator pedal 83), and controls the operations of the engine 22 and the motors MG1 and MG2 to ensure output of a power demand equivalent to the preset torque demand to the ring gear shaft 32a. There are several operation control modes of the engine 22 and the motors MG1 and MG2. In a torque conversion drive mode, while the engine 22 is driven and controlled to output a required level of power corresponding to the power demand, the motors MG1 and MG2 are driven and controlled to enable all the output power of the engine 22 to be subjected to torque conversion by the power distribution integration mechanism 30 and the motors MG1 and MG2 and to be output to the ring gear shaft 32a. In a charge-discharge drive mode, the engine 22 is driven and controlled to output a required level of power corresponding to the sum of the power demand and electric power used to charge the battery 50 or discharged from the battery 50. The motors MG1 and MG2 are driven and controlled to enable all or part of the output power of the engine 22, which is equivalent to the power demand with charge or discharge of the battery 50, to be subjected to torque conversion by the power distribution integration mechanism 30 and the motors MG1 and MG2 and to be output to the ring gear shaft 32a. In a motor drive mode, the motor MG2 is driven and controlled to ensure output of a required level of power corresponding to the power demand to the ring gear shaft 32a, while the engine 22 stops its operation.

Figure 3:
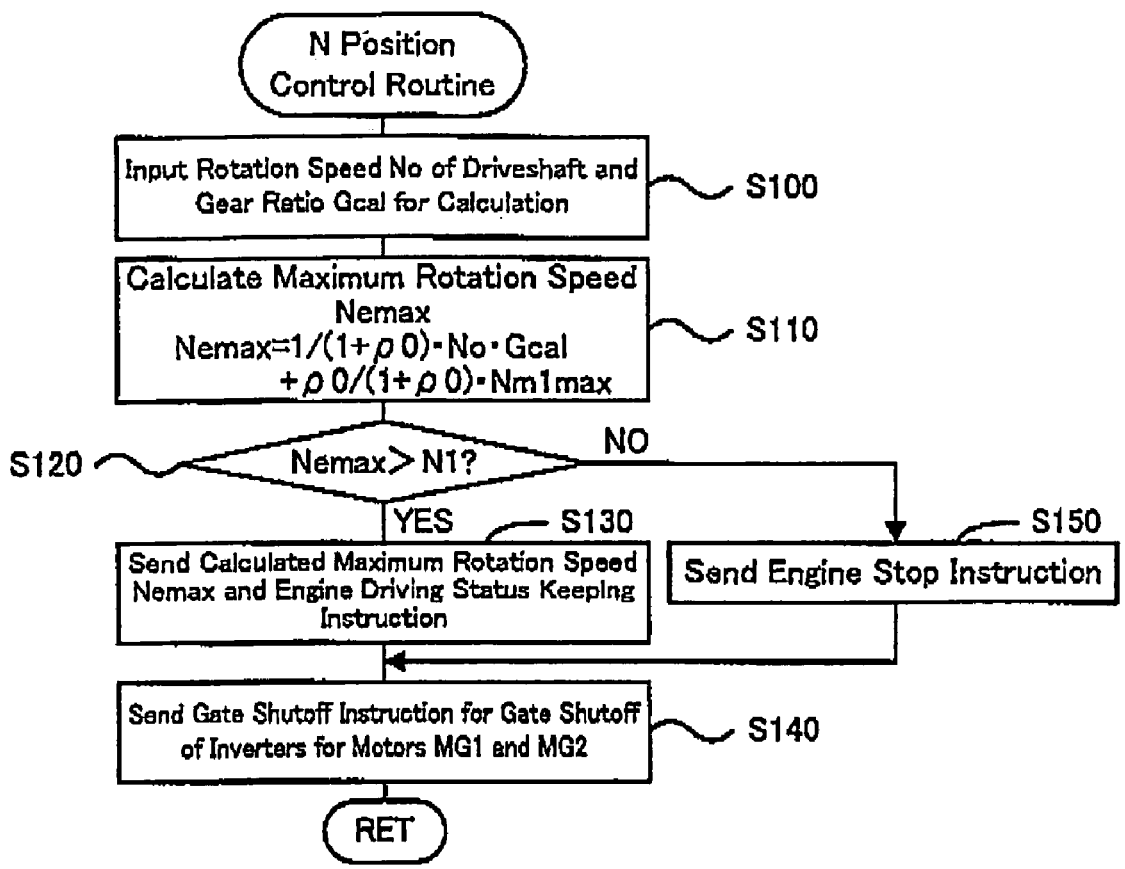
FIG. 3 is a flowchart showing an N position control routine executed by a hybrid electronic control unit included in the hybrid vehicle of the embodiment.

The following describes the operations of the hybrid vehicle 20 of the embodiment having the configuration discussed above, especially series of operation control in response to a change of the gearshift position SP from the N position to the D position or the R position. The description first regards the operation control in the setting of the gearshift position SP to the N position and then regards the operation control in response to a change of the gearshift position SP from the N position to the D position or the R position. FIG. 3 is a flowchart showing an N position control routine executed by the hybrid electronic control unit 70. This routine is repeatedly performed at preset time intervals in the setting of the gearshift position SP to the N position. In the setting of the gearshift position SP to the N position, the clutches C1 and C2 and the brakes B1, B2, and B3 are all released in the transmission 60.

In the N position control routine of FIG. 3, the CPU 72 of the hybrid electronic control unit 70 first inputs the rotation speed No of the driveshaft 36 from the rotation speed sensor 37 and a gear ratio Gcal for calculation (step S100). In the procedure of this embodiment, the gear ratio Gcal for calculation is set to a gear ratio G1 in the first speed of the transmission 60 during reverse drive of the hybrid vehicle 20 and is set to a gear ratio Grev in the reverse speed of the transmission 60 during forward drive of the hybrid vehicle 20. Such setting is ascribed to the fact that the driver's desired gear position shifted from the N position is unpredictable between the D position and the R position. The setting of the gear ratio Gcal for calculation will be described more in detail later.

The CPU 72 subsequently calculates a maximum rotation speed Nemax of the engine 22 from a gear ratio ρ0 of the power distribution integration mechanism 30, the input rotation speed No of the driveshaft 36, the input gear ratio Gcal for calculation, and an allowable rotation speed Nm1max of the motor MG1 according to Equation (1) given below (step S110):

$$\text{Nemax}=1/(1+\rho 0)\cdot \text{No}\cdot G\text{cal}+\rho 0/(1+\rho 0)\text{Nm1max} \quad (1)$$

Figure 4:
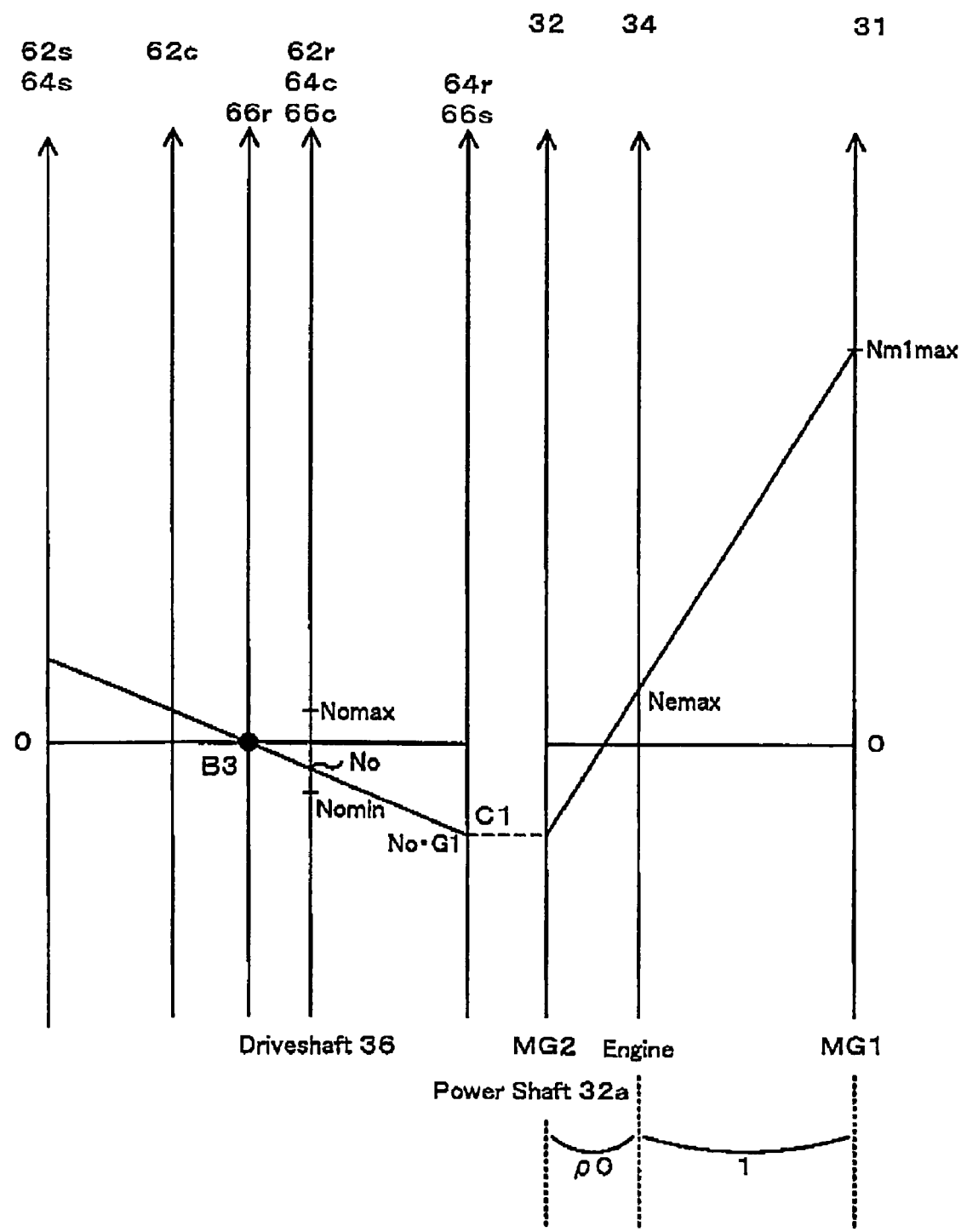
FIG. 4 is an alignment chart showing a relation of rotation speeds of respective rotational elements in a power distribution integration mechanism and the transmission included in the hybrid vehicle of the embodiment.
Figure 5:
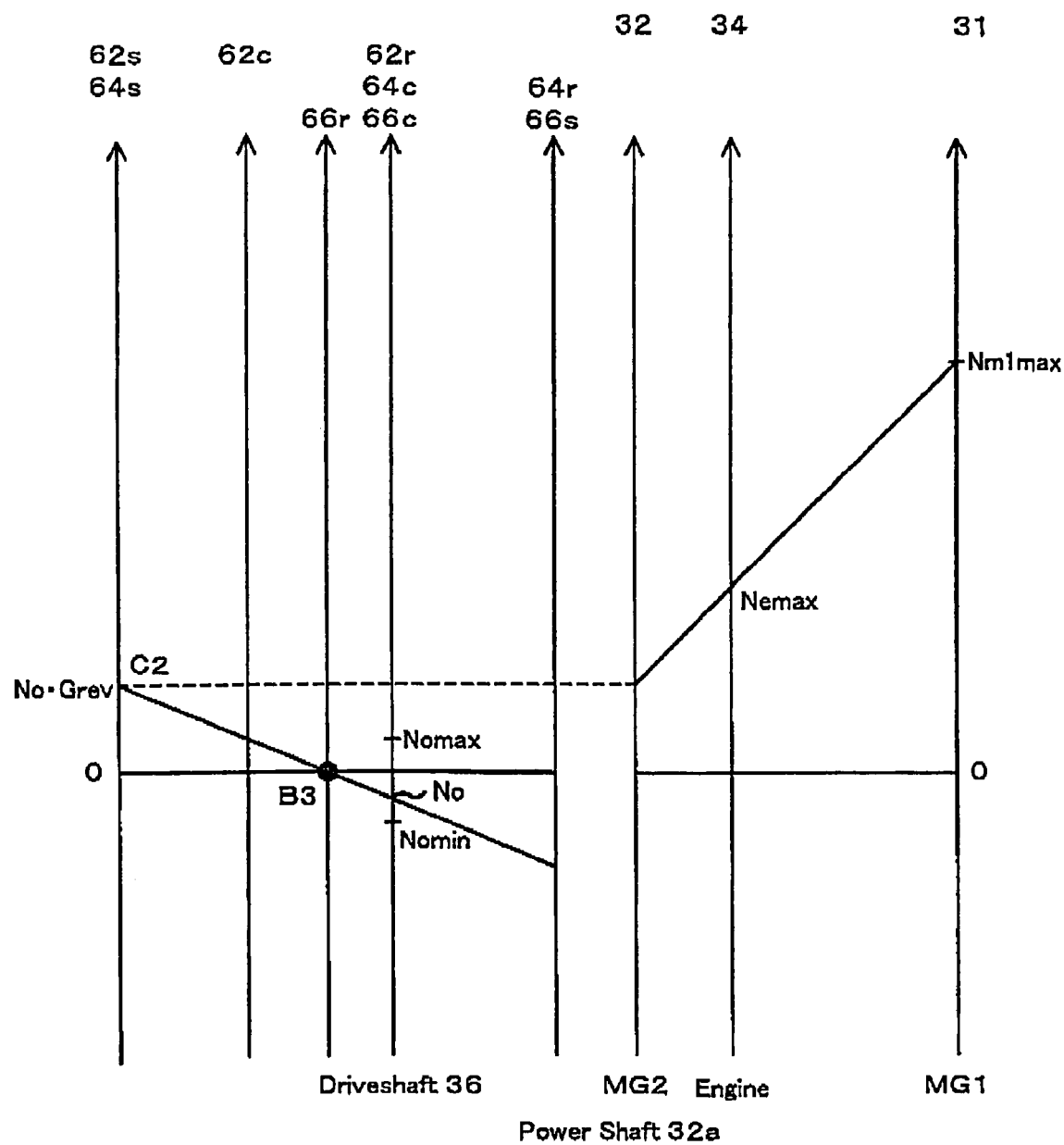
FIG. 5 is an alignment chart showing a relation of the rotation speeds of the respective rotational elements in the power distribution integration mechanism and the transmission.

The maximum rotation speed Nemax represents an upper limit rotation speed of the engine 22 operated in a range of restricting a rotation speed Nm1 of the motor MG1 to be not higher than the allowable rotation speed Nm1max. The calculated maximum rotation speed Nemax of the engine 22 is then compared with a preset reference rotation speed N1 (step S120). The reference rotation speed N1 is set equal to or a little higher than an idling rotation speed Nidl in this embodiment. For the purpose of explanation, it is assumed that the hybrid vehicle 20 slides down or otherwise moves back on an upslope at the gearshift position SP set to the N position. FIGS. 4 and 5 are alignment charts showing relations of the rotation speeds of the respective rotational elements in the power distribution integration mechanism 30 and the transmission 60. The left parts in both FIGS. 4 and 5 are alignment charts of the transmission 60. A 62s-64s-axis shows the rotation speed of the sun gear 62s in the planetary gear mechanism 62 and of the sun gear 64s in the planetary gear mechanism 64. A 62c-axis shows the rotation speed of the carrier 62c in the planetary gear mechanism 62. A 66r-axis shows the rotation speed of the ring gear 66r in the planetary gear mechanism 66. A 62r-64c-66c-axis shows the rotation speed of the ring gear 62r in the planetary gear mechanism 62, of the carrier 64c in the planetary gear mechanism 64, and of the carrier 66c in the planetary gear mechanism 66, which is equivalent to the rotation speed No of the driveshaft 36. A 64r-66s-axis shows the rotation speed of the ring gear 64r in the planetary gear mechanism 64 and of the sun gear 66s in the planetary gear mechanism 66. The right parts in both FIGS. 4 and 5 are alignment charts of the power distribution integration mechanism 30. A 32-axis shows the rotation speed of the ring gear 32 (the ring gear shaft 32a) that is equivalent to the rotation speed of the motor MG2. A 34-axis shows the rotation speed of the carrier 34 that is equivalent to the rotation speed of the engine 22. A 31-axis shows the rotation speed of the sun gear 31 that is equivalent to the rotation speed of the motor MG1. The solid line plots in FIG. 4 represent a relation of the rotation speeds on the respective axes under the condition that the rotation speed Nm1 of the motor MG1 reaches the allowable rotation speed Nm1max by engagement of the clutch C1 and the brake B3 to shift the gear of the transmission 60 to the first speed in response to a change of the gearshift position SP from the N position to the D position. The solid line plots in FIG. 5 represent a relation of the rotation speeds on the respective axes under the condition that the rotation speed Nm1 of the motor MG1 reaches the allowable rotation speed Nm1max by engagement of the clutch C2 and the brake B3 to shift the gear of the transmission 60 to the reverse speed in response to a change of the gearshift position SP from the N position to the R position. The dotted lines in FIGS. 4 and 5 indicate the rotational elements mutually linked in response to the corresponding changes of the gearshift position SP. The change of the gearshift position SP to the D position links the 64r-66s-axis to the 32-axis as shown in FIG. 4. The change of the gearshift position SP to the R position links the 62s-64s-axis to the 32-axis as shown in FIG. 5. The maximum rotation speed Nemax of the engine 22 is readily obtained from the alignment charts of FIGS. 4 and 5. In the case of a change of the gearshift position SP from the N position to either the D position or the R position during reverse drive of the vehicle, when the engine 22 is rotated at a rotation speed of not higher than the maximum rotation speed Nemax derived from the solid line plots of FIGS. 4 and 5, the gear change of the transmission 60 to the first speed or the reverse speed does not cause the rotation speed Nm1 of the motor MG1 to exceed the allowable rotation speed Nm1max. When the maximum rotation speed Nemax of the engine 22 is lower than the preset reference speed N1, the gear change of the transmission 60 to the first speed or the reverse speed during self-sustained operation of the engine 22 at the preset reference speed N1 causes the rotation speed Nm1 of the motor MG1 to exceed the allowable rotation speed Nm1max. The comparison between the maximum rotation speed Nemax of the engine 22 and the preset reference speed N1 at step S120 accordingly determines whether the gear change of the transmission 60 to the first speed or the reverse speed during self-sustained operation of the engine 22 at the preset reference speed N1 keeps the rotation speed Nm1 of the motor MG1 to or below the allowable rotation speed Nm1max. This detects a potential for over rotation of the motor MG1. As clearly understood from the comparison between the alignment charts of FIGS. 4 and 5, during reverse drive of the vehicle, the maximum rotation speed Nemax of the engine 22 is lower in the case of a gear change to the D position than in the case of a gear change to the R position. On the contrary, during forward drive of the vehicle, the maximum rotation speed Nemax of the engine 22 is lower in the case of a gear change to the R position than in the case of a gear change to the D position. At the setting of the gearshift position SP to the N position, it is unpredictable whether the driver changes the gear to the D position or to the R position. The control procedure of the embodiment accordingly sets the gear ratio Gcal for calculation, which is required for calculation of the maximum rotation speed Nemax of the engine 22 at step S110, to the gear ratio G1 in the first speed of the transmission 60 during reverse drive of the vehicle, while setting the gear ratio Gcal for calculation to the gear ratio Grev in the reverse speed of the transmission 60 during forward drive of the vehicle. Such setting ensures appropriate calculation of the maximum rotation speed Nemax. In the alignment charts of FIGS. 4 and 5, preset rotation speeds Nomin and Nomax represent a lower limit and an upper limit of the rotation speed No of the driveshaft 36 when the maximum rotation speed Nemax calculated according to Equation (1) given above is equal too. The rotation speed Nomin represents a lower limit rotation speed under the condition that the rotation speed Nm1 of the motor MG1 reaches the allowable rotation speed Nm1max by engagement of the clutch C1 and the brake B3 to shift the gear of the transmission 60 to the first speed in response to a change of the gearshift position SP to the D position during reverse drive of the vehicle. The rotation speed Nomax represents an upper limit rotation speed under the condition that the rotation speed Nm1 of the motor MG1 reaches the allowable rotation speed Nm1max by engagement of the clutch C2 and the brake B3 to shift the gear of the transmission 60 to the reverse speed in response to a change of the gearshift position SP to the R position during forward drive of the vehicle.

When the maximum rotation speed Nemax of the engine 22 is not lower than the preset reference rotation speed N1 (step S120: yes), there is no potential for over rotation of the motor MG1 by the gear change of the transmission 60 to the first speed or the reverse speed during self-sustained operation of the engine 22 at the preset reference speed N1. The CPU 72 accordingly sends the calculated maximum rotation speed Nemax of the engine 22 and an engine driving status keeping instruction for keeping the current driving status of the engine 22 to the engine ECU 24 (step S130). The CPU 72 also sends a gate shutoff instruction for gate shutoff of the inverters 41 and 42 for the motors MG1 and MG2 to the motor ECU 40 (step S140) and exits from the N position control routine. The engine ECU 24 receives the maximum rotation speed Nemax of the engine 22 and the engine driving status keeping instruction. In the state of the self-sustained operation of the engine 22, the engine ECU 24 performs fuel injection control and ignition control of the engine 22 to keep the self-sustained operation of the engine 22 at a rotation speed of or below the maximum rotation speed Nemax. In the operation stop state of the engine 22, on the other hand, the engine ECU 24 keeps the engine 22 at stop. In the hybrid vehicle 20 of the embodiment, at the gearshift position SP set to the N position, the engine 22 is operated in the self-sustained state at the preset reference rotation speed N1 or is stopped. The transmission of the maximum rotation speed Nemax to the engine ECU 24 may thus be omitted from the processing of step S130.

When the maximum rotation speed Nemax of the engine 22 is lower than the preset reference rotation speed N1 (step S120: no), on the other hand, there is a potential for over rotation of the motor MG1 by the gear change of the transmission 60 to the first speed in the self-sustained operation of the engine 22 during reverse drive of the vehicle or by the gear change of the transmission 60 to the reverse speed in the self-sustained operation of the engine 22 during forward drive of the vehicle. The CPU 72 accordingly sends an engine stop instruction for stopping the operation of the engine 22 to the engine ECU 24 (step S150) and exits from the N position control routine.

As described above, the N position control of this embodiment allows the self-sustained operation of the engine 22 or stops the operation of the engine 22 when the maximum rotation speed Nemax of the engine 22 is not lower than the preset reference rotation speed N1, while stopping the operation of the engine 22 when the maximum rotation speed Nemax of the engine 22 is lower than the preset reference rotation speed N1.

Figure 6:
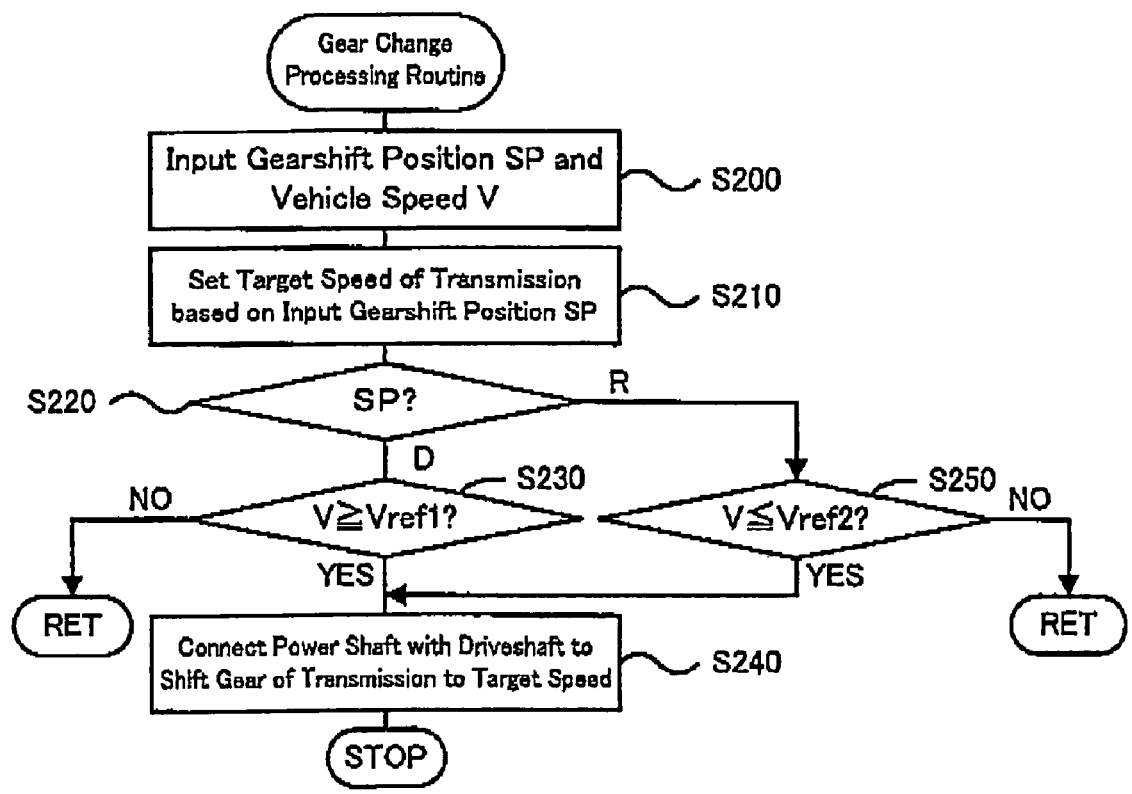
FIG. 6 is a flowchart showing a gear change processing routine executed by the hybrid electronic control unit.

The series of processing executed in response to a change of the gearshift position SP from the N position to the D position or the R position is described below. FIG. 6 is a flowchart showing a gear change processing routine executed by the hybrid electronic control unit 70. This routine is repeatedly performed at preset time intervals until actual implementation of the gear change of the transmission 60 to the first speed or the reverse speed in response to a change of the gearshift position SP to the D position or the R position, that is, until connection of the ring gear shaft 32a or the power shaft with the driveshaft 36 at a preset gear ratio (the gear ratio G1 in the first speed or the gear ratio Grev in the reverse speed). The change of the gearshift position SP is detected based on an output signal of the gearshift position sensor 82 in the structure of the embodiment.

In the gear change processing routine, the CPU 72 of the hybrid electronic control unit 70 first inputs the gearshift position SP from the gearshift position sensor 82 and the vehicle speed V from the vehicle speed sensor 88 (step S200) and sets a target speed of the transmission 60 based on the input gearshift position SP (step S210). In this embodiment, the target speed of the transmission 60 is set to the first speed in response to the gearshift position SP of the D position, while being set to the reverse speed in response to the gearshift position SP to the R position.

The CPU 72 subsequently identifies the current setting of the gearshift position SP (step S220). Upon identification of the gearshift position SP set to the D position, the input vehicle speed V is compared with a preset reference speed Vref1 (step S230). The reference speed Vref1 is set to a vehicle speed of slightly higher (closer to 0) than an upper limit of a specific vehicle speed range having a potential for over rotation of the motor MG1 by the gear change of the transmission 60 to the first speed, that is, by connection of the ring gear shaft 32a with the driveshaft 36 to make the rotation speed ratio of the ring gear shaft 32a to the driveshaft 36 approach to the gear ratio G1 in the first speed of the transmission 60, regardless of the self-sustained operation or the operation stop state of the engine 22. The reference speed Vref1 may be set to a vehicle speed equivalent to the preset rotation speed Nomin or a slightly higher vehicle speed. A negative vehicle speed (vehicle speed in the reverse direction) is generally set to the reference speed Vref1. When the vehicle speed V is not lower than the preset reference speed Vref1, that is, when the vehicle speed in the reverse direction is not greater than the magnitude of the reference speed Vref1 (step S230: yes), the actuator (not shown) is activated to engage the clutch C1 and the brake B3 and change the gear of the transmission 60 to the first speed (step S240). The CPU 12 then exits from the gear change processing routine. When the vehicle speed V is lower than the preset reference speed Vref1, that is, when the vehicle speed in the reverse direction is greater than the magnitude of the reference speed Vref1 (step S230: no), on the other hand, there is a potential for over rotation of the motor MG1 by the gear change of the transmission 60 to the first speed, regardless of the self-sustained operation or the operation stop state of the engine 22. The gear change processing routine is thus terminated without activating the actuator to engage the clutch C1 and the brake B3. When the vehicle speed V is lower than the preset reference speed Vref1 at the time of a change of the gearshift position SP from the N position to the D position, the control procedure of this embodiment prohibits the connection of the ring gear shaft 32a with the driveshaft 36 and the actual gear change of the transmission 60 to the first speed, in spite of the change of the gearshift position SP. Such control effectively prevents the over rotation of the motor MG1. When the maximum rotation speed Nemax of the engine 22 is lower than the preset reference rotation speed N1 at the gearshift position SP set to the N position and when the vehicle speed V is not lower than the preset reference speed Vref1 at the time of a change of the gearshift position SP to the D position, the control procedure of the embodiment shifts the gear of the transmission 60 to the first speed in the operation stop state of the engine 22. Such control desirably enables the gear change of the transmission 60 to the first speed in a wider operation range, compared with the conventional control of shifting the gear of the transmission 60 to the first speed only in a specific range of the vehicle speed V (=the rotation speed No of the driveshaft 36) where the gear change of the transmission 60 to the first speed is allowed in the state of self-sustained operation of the engine 22. In this state, the control procedure of the embodiment stops the operation of the engine 22 at the gearshift position SP set to the N position. This arrangement ensures the quicker gear change of the transmission 60 to the first speed, compared with the conventional control of stopping the operation of the engine 22 after a change of the gearshift position SP from the N position to the D position.

Upon identification of the gearshift position SP set to the R position at step S220, on the other hand, the input vehicle speed V is compared with a preset reference speed Vref2 (step S250). The reference speed Vref2 is set to a vehicle speed of slightly lower than a lower limit of a specific vehicle speed range having a potential for over rotation of the motor MG1 by the gear change of the transmission 60 to the reverse speed, that is, by connection of the ring gear shaft 32a with the driveshaft 36 to make the rotation speed ratio of the ring gear shaft 32a to the driveshaft 36 approach to the gear ratio Grev in the reverse speed of the transmission 60, regardless of the self-sustained operation or the operation stop state of the engine 22. The reference speed Vref2 may be set to a vehicle speed equivalent to the preset rotation speed Nomax or a slightly lower vehicle speed. A positive vehicle speed (vehicle speed in the forward direction) is generally set to the reference speed Vref2. When the vehicle speed V is not higher than the preset reference speed Vref2 (step S250: yes) the actuator (not shown) is activated to engage the clutch C2 and the brake B3 and change the gear of the transmission 60 to the reverse speed (step S240). The CPU 72 then exits from the gear change processing routine. When the vehicle speed V is higher than the preset reference speed Vref2 (step S250: no), on the other hand, there is a potential for over rotation of the motor MG1 by the gear change of the transmission 60 to the reverse speed, regardless of the self-sustained operation or the operation stop state of the engine 22. The gear change processing routine is thus terminated without activating the actuator to engage the clutch C2 and the brake B3. When the vehicle speed V is higher than the preset reference speed Vref2 at the time of a change of the gearshift position SP from the N position to the R position, the control procedure of this embodiment prohibits the connection of the ring gear shaft 32a with the driveshaft 36 and the actual gear change of the transmission 60 to the reverse speed, in spite of the change of the gearshift position SP. Such control effectively prevents the over rotation of the motor MG1. When the maximum rotation speed Nemax of the engine 22 is lower than the preset reference rotation speed N1 at the gearshift position SP set to the N position and when the vehicle speed V is not higher than the preset reference speed Vref2 at the time of a change of the gearshift position SP to the R position, the control procedure of the embodiment shifts the gear of the transmission 60 to the reverse speed in the operation stop state of the engine 22. Such control desirably enables the gear change of the transmission 60 to the reverse speed in a wider operation range, compared with the conventional control of shifting the gear of the transmission 60 to the reverse speed only in a specific range of the vehicle speed V (=the rotation speed No of the driveshaft 36) where the gear change of the transmission 60 to the reverse speed is allowed in the state of self-sustained operation of the engine 22. In this state, the control procedure of the embodiment stops the operation of the engine 22 at the gearshift position SP set to the N position. This arrangement ensures the quicker gear change of the transmission 60 to the reverse speed, compared with the conventional control of stopping the operation of the engine 22 after a change of the gearshift position SP from the N position to the R position.

In the hybrid vehicle 20 of the embodiment described above, when the vehicle speed V is lower than the preset reference speed Vref1 at the time of a change of the gearshift position SP from the N position to the D position or when the vehicle speed V is higher than the preset reference speed Vref2 at the time of a change of the gearshift position SP from the N position to the R position, the control procedure prohibits the connection of the ring gear shaft 32a with the driveshaft 36 and the actual gear change of the transmission 60 to the first speed or to the reverse speed, in spite of the change of the gearshift position SP. Such control effectively prevents over rotation of the motor MG1. When the maximum rotation speed Nemax of the engine 22 is lower than the preset reference rotation speed N1 at the gearshift position SP set to the N position and either when the vehicle speed V is not lower than the preset reference speed Vref1 at the time of a change of the gearshift position SP from the N position to the D position or when the vehicle speed V is not higher than the preset reference speed Vref2 at the time of a change of the gearshift position SP from the N position to the R position, the control procedure of the embodiment shifts the gear of the transmission 60 to the first speed or to the reverse speed in the operation stop state of the engine 22. Such control desirably ensures the gear change of the transmission 60 to the first speed or to the reverse speed in a wider operation range, in response to a change of the gearshift position SP. This arrangement effectively expands the range of the vehicle speed V (the rotation speed No of the driveshaft 36) responding the driver's gearshift operation. In this state, the control procedure of the embodiment stops the operation of the engine 22 at the gearshift position SP set to the N position. This arrangement ensures the quicker gear change of the transmission 60 to the first speed or to the reverse speed, compared with the conventional control of stopping the operation of the engine 22 after a change of the gearshift position SP from the N position to the D position or to the R position.

In the hybrid vehicle 20 of the embodiment, when the maximum rotation speed Nemax of the engine 22 is lower than the preset reference rotation speed N1 at the gearshift position SP set to the N position and either when the vehicle speed V is not lower than the preset reference speed Vref1 at the time of a change of the gearshift position SP from the N position to the D position or when the vehicle speed V is not higher than the preset reference speed Vref2 at the time of a change of the gearshift position SP from the N position to the R position, the control procedure stops the operation of the engine 22 at the gearshift position SP set to the N position. One possible modification of the control procedure may stop the operation of the engine 22 in response to a change of the gearshift position SP from the N position to the D position or to the R position and subsequently shift the gear of the transmission 60 to the first speed or to the reverse speed. In such modification, at the gearshift position SP set to the N position, the engine 22 may be operated in the self-sustained state or may be stopped without calculation of the maximum rotation speed Nemax of the engine 22, that is, regardless of the maximum rotation speed Nemax. In response to a change of the gearshift position SP from the N position to the D position or to the R position, the maximum rotation speed Nemax of the engine 22 may be calculated. The gear of the transmission 60 may subsequently be shifted to the first speed or to the reverse speed based on the calculated maximum rotation speed Nemax in the operation stop state or the state of self-sustained operation of the engine 22.

In the hybrid vehicle 20 of the embodiment, when the maximum rotation speed Nemax of the engine 22 is lower than the preset reference rotation speed N1 at the gearshift position SP set to the N position and either when the vehicle speed V is not lower than the preset reference speed Vref1 at the time of a change of the gearshift position SP from the N position to the D position or when the vehicle speed V is not higher than the preset reference speed Vref2 at the time of a change of the gearshift position SP from the N position to the R position, the control procedure shifts the gear of the transmission 60 to the first speed or to the reverse speed in the operation stop state of the engine 22. When there is a potential for over rotation of the motor MG1 by the gear change of the transmission 60 to the first speed or to the reverse speed during self-sustained operation of the engine 22, the gear of the transmission 60 may not be shifted to the first speed or to the reverse speed. In such modification, the reference speed Vref1 used to specify the permission or the prohibition of an actual gear change of the transmission 60 to the first speed may be set to be a slightly higher vehicle speed than an upper limit of a vehicle speed range having a potential for over rotation of the motor MG1 by the gear change of the transmission 60 to the first speed during self-sustained operation of the engine 22. The reference speed Vref2 used to specify the permission or the prohibition of an actual gear change of the transmission 60 to the reverse speed may be set to be a slightly lower vehicle speed than a lower limit of a vehicle speed range having a potential for over rotation of the motor MG1 by the gear change of the transmission 60 to the reverse speed during self-sustained operation of the engine 22.

In the hybrid vehicle 20 of the embodiment, the gear ratio Gcal for calculation of the maximum rotation speed Nemax of the engine 22 is set to the gear ratio G1 in the first speed of the transmission 60 during reverse drive of the vehicle, while being set to the gear ratio Grev in the reverse speed of the transmission 60 during forward drive of the vehicle. In one possible modification, the gear ratio Gcal for calculation may be fixed to the gear ratio G1 in the first speed of the transmission 60 or to the gear ratio Grev in the reverse speed of the transmission 60, regardless of the forward drive or the reverse drive of the vehicle.

The hybrid vehicle 20 of the embodiment uses the rotation speed No of the driveshaft 36 for calculation of the maximum rotation speed Nemax of the engine 22. In the structure without the rotation speed sensor 37 for measuring the rotation speed No of the driveshaft 36, the product of the vehicle speed V by a conversion factor k may be used for calculation, in place of the rotation speed No of the driveshaft 36.

In response to a change of the gearshift position SP from the N position to the D position or to the R position, the hybrid vehicle 20 of the embodiment refers to the vehicle speed V and specifies the permission or the prohibition of an actual gear change of the transmission 60 to the first speed or to the reverse speed, that is, the permission or the prohibition of connection of the ring gear shaft 32a with the driveshaft 36 to make the rotation speed ratio of the ring gear shaft 32a to the driveshaft 36 approach to the gear ratio G1 in the first speed of the transmission 60 or to the gear ratio Grev in the reverse speed of the transmission 60. The rotation speed No of the driveshaft 36 may be referred to for the specification, in place of the vehicle speed V.

In the hybrid vehicle 20 of the embodiment, when the vehicle speed V is not lower than the preset reference speed Vref1 at the time of a change of the gearshift position SP from the N position to the D position, the gear of the transmission 60 is shifted to the first speed, irrespective of the vehicle speed V. The gear of the transmission 60 may be shifted to one of the first through the fourth speeds under this condition, based on the vehicle speed V or the rotation speed No of the driveshaft 36.

The hybrid vehicle 20 of the embodiment has the transmission 60 that has four different speeds for the gear change. The number of different speeds is not restricted to four, but the transmission may have two different speeds or any greater number of different speeds for the gear change.

In the hybrid vehicle 20 of the embodiment, the power of the engine 22 is output via the power distribution integration mechanism 30 to the ring gear shaft 32a or the power shaft that is connected via the transmission 60 to the driveshaft 36 linked to the drive wheels 39a and 39b. In one modified structure, the hybrid vehicle may be equipped with a pair-rotor motor, which includes an inner rotor connected to a crankshaft of an engine and an outer rotor connected to a power shaft that is linked via a transmission to a driveshaft for outputting power to drive wheels. The pair-rotor motor transmits part of the output power of the engine to the drive wheels via the power shaft, the transmission, and the driveshaft, while converting the residual engine output power into electric power.

The hybrid vehicle 20 of the embodiment is equipped with the engine 22, the power distribution integration mechanism 30, the motors MG1 and MG2, the battery 50, and the transmission 60. In one possible modification, the motor MG2 may be omitted from the structure of the hybrid vehicle.

The primary elements in the embodiment and its modified examples are mapped to the primary constituents in the claims of the invention as described below. The engine 22 in the structure of the embodiment corresponds to the 'internal combustion engine' of the invention. The three shaft-type power distribution integration mechanism 30 that is linked to the crankshaft 26 or the output shaft of the engine 22 via the damper 28 and to the ring gear shaft 32a or the power shaft and rotates based on the rotation speed of the engine 22 and the rotation speed of the ring gear shaft 32a, and the motor MG1 that is connected to the power distribution integration mechanism 30 and has the power generation capability in the structure of the embodiment are equivalent to the 'electric power-mechanical power input output structure' of the invention. The battery 50 that transmits electric power to and from the motor MG1 in the structure of the embodiment corresponds to the 'accumulator' of the invention. The transmission 60 that is constructed to connect the ring gear shaft 32a as the power shaft with the driveshaft 36 linked to the drive wheels 39a and 39b for transmission of power between the ring gear shaft 32a and the driveshaft 36 with a change of the speed and to disconnect the ring gear shaft 32a from the driveshaft 36 in the structure of the embodiment is equivalent to the 'transmission' of the invention. The vehicle speed sensor 88 and the gearshift position sensor 82 in the structure of the embodiment respectively correspond to the 'vehicle speed measurement unit' and the 'gearshift position detection unit' of the invention. The hybrid electronic control unit 70 that executes the series of processing to set the target speed of the transmission 60 based on the gearshift position SP in the structure of the embodiment is equivalent to the 'target state setting module' of the invention. The hybrid electronic control unit 70 that executes the control to engage the clutch C1 and the brake B3 and attain an actual gear change of the transmission 60 to the first speed in response to a change of the gearshift position SP from the N position to the D position when the vehicle speed V is not lower than the preset reference speed Vref1, to release the clutch C1 and the brake B3 and prohibit the actual gear change of the transmission 60 to the first speed in response to the change of the gearshift position SP from the N position to the D position when the vehicle speed V is lower than the preset reference speed Vref1, to engage the clutch C2 and the brake B3 and attain an actual gear change of the transmission 60 to the reverse speed in response to a change of the gearshift position SP from the N position to the R position when the vehicle speed V is not higher than the preset reference speed Vref2, and to release the clutch C2 and the brake B3 and prohibit the actual gear change of the transmission 60 to the reverse speed in response to the change of the gearshift position SP from the N position to the R position when the vehicle speed V is higher than the preset reference speed Vref2 in the structure of the embodiment is equivalent to the 'control module' of the invention. The motor MG2 that inputs and outputs power from and to the ring gear shaft 32a or the power shaft in the structure of the embodiment corresponds to the 'motor' of the invention. This mapping of the primary elements in the embodiment and its modified examples to the primary constituents in the claims of the invention are not restrictive in any sense but are only illustrative for concretely describing some modes of carrying out the invention. Namely the embodiment and its modified examples discussed above are to be considered in all aspects as illustrative and not restrictive. The scope and spirit of the present invention are indicated by the appended claims, rather than by the foregoing description.

The embodiment regards application of the invention to the hybrid vehicle. This application is, however, only illustrative and not restrictive in any sense. The technique of the invention may be actualized by diversity of other applications, for example, various vehicles including automobiles and other vehicles as well as control methods of such various vehicles.

The embodiment discussed above is to be considered in all aspects as illustrative and not restrictive. There may be many modifications, changes, and alterations without departing from the scope or spirit of the main characteristics of the present invention. The scope and spirit of the present invention are indicated by the appended claims, rather than by the foregoing description.

The disclosure of Japanese Patent Application No. 2006-272434 filed Oct. 4, 2006 including specification, drawings and claims is incorporated herein by reference in its entirety.

What is claimed is:

1. A vehicle, comprising:
an internal combustion engine;
an electric power-mechanical power input output structure that is connected to an output shaft of the internal combustion engine and to a power shaft, which is rotatable independently of the output shaft, and inputs and outputs driving force from and to the output shaft and the power shaft with rotation based on a rotation speed of the output shaft and a rotation speed of the power shaft and input and output of electric powers and mechanical powers;
an accumulator that transmits electric power to and from the electric power-mechanical power input output structure;
a transmission that is constructed to connect the power shaft with a driveshaft linked to drive wheels for transmission of power between the power shaft and the driveshaft with a change of speed and to disconnect the power shaft from the driveshaft;
a vehicle speed measurement unit that measures a vehicle speed;
a gearshift position detection unit that detects a setting of gearshift position;
a target state setting module that sets a target state of the transmission based on the detected setting of gearshift position; and
a control module that controls the transmission to connect the power shaft with the driveshaft and attain an actual gear change of the transmission to the target state in response to a change of the gearshift position from a neutral position to a driving position when the measured vehicle speed is within a predetermined vehicle speed range, while controlling the transmission to prohibit the connection of the power shaft with the driveshaft and the actual gear change of the transmission to the target state regardless of the change of the gearshift position from the neutral position to the driving position when the measured vehicle speed is out of the predetermined vehicle speed range.

2. The vehicle in accordance with claim 1, wherein the electric power-mechanical power input output structure has: a three shaft-type power input output mechanism that is connected to three shafts, the output shaft of the internal combustion engine, the power shaft, and a third shaft and determines input and output of power into and from a remaining shaft based on input and output of powers into and from any two shafts among the three shafts; and a generator that inputs and outputs power into and from the third shaft.

3. The vehicle in accordance with claim 2, wherein the control module performs the control with regarding a state expected to restrict a rotation speed of the generator to or below an allowable rotation speed of the generator by the connection of the power shaft with the driveshaft at least in an operation stop state of the internal combustion engine as the measured vehicle speed within the predetermined vehicle speed range and regarding a state expected to make the rotation speed of the generator exceed the allowable rotation speed of the generator by the connection of the power shaft with the driveshaft irrespective of a current status of the internal combustion engine as the measured vehicle speed out of the predetermined vehicle speed range.

4. The vehicle in accordance with claim 2, wherein, when a maximum rotation speed of the internal combustion engine, which is set based on either one of the vehicle speed and a rotation speed of the driveshaft, a change gear ratio in a specified speed of the transmission, and an allowable rotation speed of the generator, is lower than a preset reference rotation speed and when the measured vehicle speed is within the predetermined vehicle speed range at a time of a change of the gearshift position from the neutral position to the driving position, the control module controls the internal combustion engine and the transmission to connect the power shaft with the driveshaft and attain the actual gear change of the transmission to the target state in an operation stop state of the internal combustion engine.

5. The vehicle in accordance with claim 4, wherein when the maximum rotation speed of the internal combustion engine is lower than the preset reference rotation speed at the gearshift position set to the neutral position, the control module controls the internal combustion engine to stop its operation.

6. The vehicle in accordance with claim 4, wherein the control module sets the maximum rotation speed of the internal combustion engine with setting a speed for forward drive of the vehicle to the specified speed of the transmission during reverse drive of the vehicle, while setting the maximum rotation speed of the internal combustion engine with setting a speed for reverse drive of the vehicle to the specified speed of the transmission during forward drive of the vehicle.

7. The vehicle in accordance with claim 1, wherein the transmission has multiple clutches and engages and releases the multiple clutches to connect the power shaft with the driveshaft for transmission of power between the power shaft and the driveshaft with a change of speed and to disconnect the power shaft from the driveshaft.

8. The vehicle in accordance with claim 1, the vehicle further having:
a motor that inputs and outputs power from and to the power shaft and transmits electric power to and from the accumulator.

9. A driving system that is mounted in combination with an internal combustion engine and an accumulator on a vehicle, the driving system comprising:
an electric power-mechanical power input output structure that is connected to an output shaft of the internal combustion engine and to a power shaft, which is rotatable independently of the output shaft, transmits electric power to and from the accumulator, and inputs and outputs driving force from and to the output shaft and the power shaft with rotation based on a rotation speed of the output shaft and a rotation speed of the power shaft and input and output of electric powers and mechanical powers;
a transmission that is constructed to connect the power shaft with a driveshaft linked to drive wheels for transmission of power between the power shaft and the driveshaft with a change of speed and to disconnect the power shaft from the driveshaft;
a drive shaft rotation speed measurement unit that measures a rotation speed of the driveshaft;
a target state setting module that sets a target state of the transmission based on a setting of gearshift position; and
a control module that controls the transmission to connect the power shaft with the driveshaft and attain an actual gear change of the transmission to the target state in response to a change of the gearshift position from a neutral position to a driving position when the measured rotation speed of the driveshaft is within a predetermined rotation speed range, while controlling the transmission to prohibit the connection of the power shaft with the driveshaft and the actual gear change of the transmission to the target state regardless of the change of the gearshift position from the neutral position to the driving position when the measured rotation speed of the driveshaft is out of the predetermined rotation speed range.

10. A control method of a vehicle, the vehicle having: an internal combustion engine; an electric power-mechanical power input output structure that is connected to an output shaft of the internal combustion engine and to a power shaft, which is rotatable independently of the output shaft, and inputs and outputs driving force from and to the output shaft and the power shaft with rotation based on a rotation speed of the output shaft and a rotation speed of the power shaft and input and output of electric powers and mechanical powers; an accumulator that transmits electric power to and from the electric power-mechanical power input output structure; and a transmission that is constructed to connect the power shaft with a driveshaft linked to drive wheels for transmission of power between the power shaft and the driveshaft with a change of speed and to disconnect the power shaft from the driveshaft,
the control method comprising:
setting a target state of the transmission based on a setting of gearshift position; and
controlling the transmission to connect the power shaft with the driveshaft and attain an actual gear change of the transmission to the target state in response to a change of the gearshift position from a neutral position to a driving position when vehicle speed is within a predetermined vehicle speed range, while controlling the transmission to prohibit the connection of the power shaft with the driveshaft and the actual gear change of the transmission to the target state regardless of the change of the gearshift position from the neutral position to the driving position when the vehicle speed is out of the predetermined vehicle speed range.

11. A control method of a driving system, the driving system being mounted in combination with an internal combustion engine and an accumulator on a vehicle and having: an electric power-mechanical power input output structure that is connected to an output shaft of the internal combustion engine and to a power shaft, which is rotatable independently of the output shaft, transmits electric power to and from the accumulator, and inputs and outputs driving force from and to the output shaft and the power shaft with rotation based on a rotation speed of the output shaft and a rotation speed of the power shaft and input and output of electric powers and mechanical powers; and a transmission that is constructed to connect the power shaft with a driveshaft linked to drive wheels for transmission of power between the power shaft and the driveshaft with a change of speed and to disconnect the power shaft from the driveshaft,
the control method comprising:
setting a target state of the transmission based on a setting of gearshift position; and
controlling the transmission to connect the power shaft with the driveshaft and attain an actual gear change of the transmission to the target state in response to a change of the gearshift position from a neutral position to a driving position when rotation speed of the driveshaft is within a predetermined rotation speed range, while controlling the transmission to prohibit the connection of the power shaft with the driveshaft and the actual gear change of the transmission to the target state regardless of the change of the gearshift position from the neutral position to the driving position when the rotation speed of the driveshaft is out of the predetermined rotation speed range.

* * * * *